United States Patent [19]  
Brendel

[11] Patent Number: 4,760,631  
[45] Date of Patent: Aug. 2, 1988

[54] ROLL

[75] Inventor: Bernhard Brendel, Grefrath-Mulhausen, Fed. Rep. of Germany

[73] Assignee: Eduard Kusters Maschinenfabrik GmbH & Co. KG, Krefeld, Fed. Rep. of Germany

[21] Appl. No.: 892,359

[22] Filed: Jul. 31, 1986

[30] Foreign Application Priority Data

Jul. 31, 1985 [DE] Fed. Rep. of Germany ....... 3527398

[51] Int. Cl.$^4$ ............................................. B21B 27/00
[52] U.S. Cl. ................................... 29/116.1; 29/129.5; 29/113.1
[58] Field of Search ...... 29/116 AD, 116 R, 113 AD, 29/113 R, 110, 129.5, 130; 100/93 RD, 121, 155 R, 162 B, 163 A

[56] References Cited

U.S. PATENT DOCUMENTS 4,187,594 2/1980 Appenzeller ............... 29/116 AD  
4,188,698 2/1980 Appenzeller ............... 29/116 AD  
4,447,940 5/1984 Appenzeller et al. ......... 29/116 AD

FOREIGN PATENT DOCUMENTS 1026609 3/1958 Fed. Rep. of Germany .  
1193739 1/1966 Fed. Rep. of Germany .  
2461914 6/1977 Fed. Rep. of Germany .  
2744524 11/1978 Fed. Rep. of Germany .  
3306838 8/1984 Fed. Rep. of Germany .  
3128722 5/1985 Fed. Rep. of Germany .  
1539129 1/1979 United Kingdom .

Primary Examiner—Mark Rosenbaum  
Assistant Examiner—Irene Cuda  
Attorney, Agent, or Firm—Kenyon & Kenyon

[57] ABSTRACT

An improved roller apparatus for treating material webs, in which energy requirements are reduced by decreasing losses caused by fluid turbulence. The apparatus includes a cylindrical, hollow roll, supported on a shaft by hydraulic fluid under pressure. Longitudinal seals subdivide the area between the roll and the shaft into chambers. As the roll rotates, a fluid flow is established within the cylinder, in the direction of rotation. Rather than allow the fluid to establish a turbulent return flow path within each chamber, a return path isolated from the rotational flow is provided. One such return path is a group of channels formed transversely through the shaft, or alternately, recesses can be formed circumferentially in the shaft, covered to separate the return flow from the rotational flow.

13 Claims, 3 Drawing Sheets

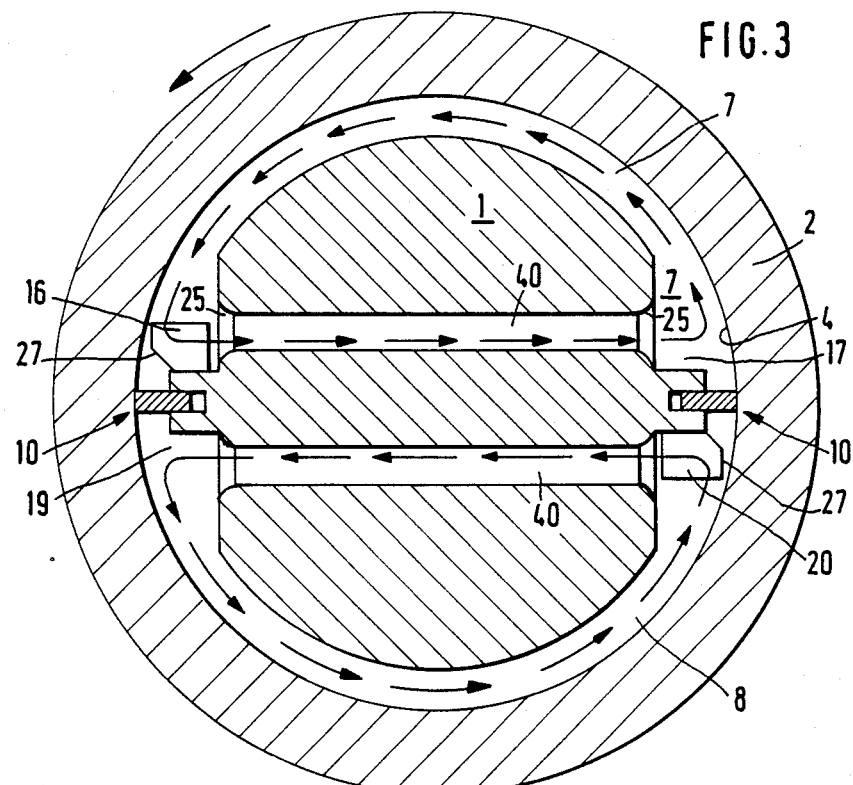
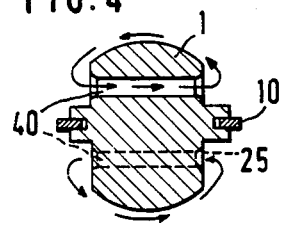
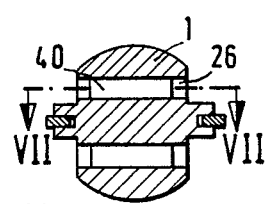
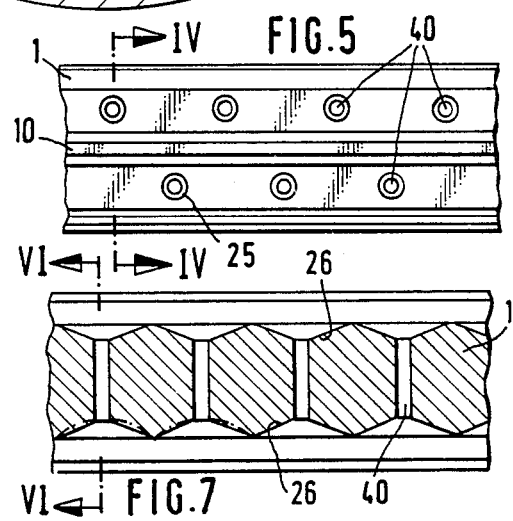

ROLL

BACKGROUND OF THE INVENTION

This invention relates to the field of treating webs of material with pressure rolls, and more particularly to the field of improved pressure roll apparatus.

Many industries require the treatment of material webs with roller apparatus, for sizing, smoothing and similar operations. The paper and textile industries furnish two prominent examples in which such rollers are employed for a variety of tasks, with a roll usually opposed to another roll and the material passing through the nip between the rolls.

A widely used roll apparatus is the so-called "swimming" roll, in which a pressure roll, generally in the form of a hollow cylinder, is carried on a support extending concentrically through the pressure roll, with hydraulic fluid introduced into the gap between the two elements, resiliently supporting the pressure roll during operation. Usually, the space between the pressure roll and its support is subdivided into at least two chambers by longitudinal seals, carried on the support and bearing against the inner surface of the pressure roll, as described in Federal Republic of Germany Pat. No. 1,026,609. Although that reference describes an arrangement whereby the seals are placed 180 degrees apart, other arrangements are possible. For example, Federal Republic of Germany Auslegeschrift No. 2,461,914 teaches a placement in which the longitudinal seals are arranged to form two unequal chambers, the smaller of which is located in the area of the nip.

A major difficulty with swimming rolls has been the power loss occasioned by turbulence in the hydraulic fluid, as explained in detail hereafter. The present invention solves that problem, and thus it offers an improved and more efficient roll system.

SUMMARY OF THE INVENTION

The broad object of the present invention is the provision of a roll apparatus for treating material webs, have decreased losses caused by fluid turbulence.

This and other objects are achieved in the present invention, in which a pressure roll, generally in the form of a hollow cylinder, is employed for treating a web of material. A shaft, generally a solid cylinder, is concentrically disposed within the pressure roll, the outside diameter of the shaft being smaller than the inside diameter of the pressure roll. At least two longitudinal seals are carried on the shaft, bearing against the inner surface of the pressure roll to define longitudinal chambers in the space between the pressure roll and the shaft. Hydraulic system means establish a preselected fluid pressure within the chambers; such means may include hydraulic pump means, fluid inlet ports, and end seals, as known in the art. With the hydraulic system in operation, the pressure roll is supported upon the shaft such that it is free to rotate, yet it can exert a selected degree of force upon material passing through the nip.

In operation, the pressure roll rotates and the shaft is held stationary. The rotation of the pressure roll sets up a corresponding rotational fluid flow within each chamber, in the direction of rotation. Because a chamber does not extend completely around the circumference of the shaft, the rotational flow creates a zone of high pressure adjacent the longitudinal seal toward which the pressure roll rotates and a zone of low pressure adjacent the opposite longitudinal seal. A reverse flow means, isolated from the rotational flow, extends between these two zones, allowing a fluid flow between them. The isolation of the two fluid flows eliminates turbulence resulting from interaction between such flows. Inasmuch as such turbulence has been identified as causing a major portion of power losses associated with such rolls, the provision of reverse flow means in the present invention results in marked improvement in efficiency and concomitant reduction in energy requirements.

In a preferred embodiment, the reverse flow means takes the form of channels formed transversely through the shaft. Other embodiments can employ recesses formed in the circumference of the shaft, covered to separate the reverse flow from the rotational flow.

BRIEF DESCRIPTION OF THE DRAWINGS

FIG. 3 is a transverse cross-sectional view of a preferred embodiment of the present invention;

FIG. 4 is a detail transverse cross-sectional view of a portion of the embodiment of FIG. 3, taken along the plane IV—IV of FIG. 5;

FIG. 5 is a detail side view of a portion of the embodiment of FIG. 3;

FIG. 6 is a detail transverse cross-sectional view of a portion of an alternate embodiment of the present invention, taken along the plane VI—VI of FIG. 7;

FIG. 7 is a detail side view of the embodiment of FIG. 6;

DETAILED DESCRIPTION OF PREFERRED EMBODIMENTS

Figure 1:
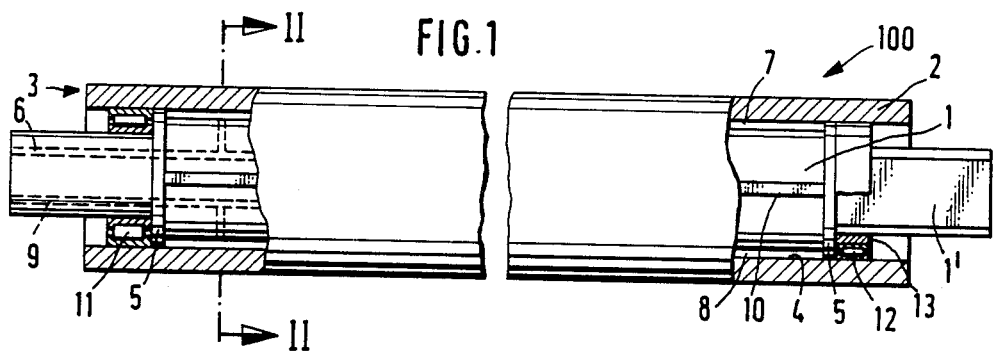
FIG. 1 is a side view of a swimming roll known in the art.
Figure 2:
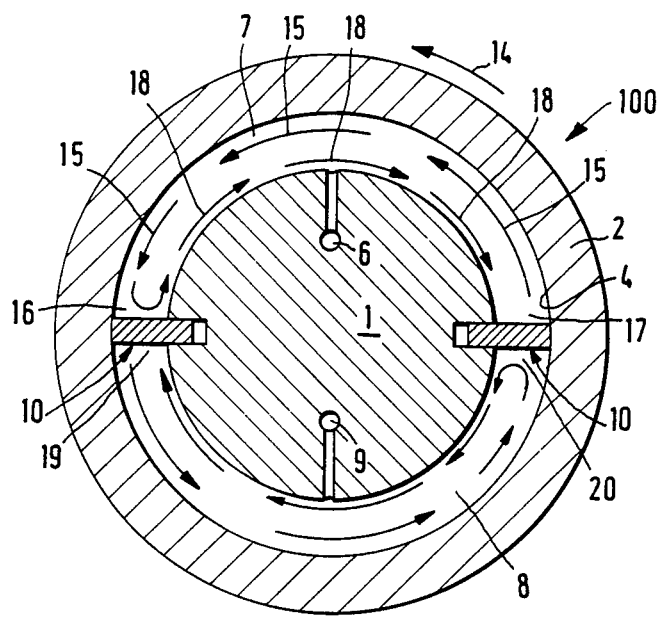
FIG. 2 is a transverse cross-sectional view of the apparatus of FIG. 1, taken along plane II—II of FIG. 1.

Understanding of the present invention will be facilitated by a thorough appreciation of the prior art and the problems inherent therein. As seen in FIGS. 1 and 2, a swimming roll 100 includes a pressure roll 2, formed as a hollow cylinder, concentrically carried on a shaft 1, which is a generally solid cylinder. The outer surface of the pressure roll forms the working surface of the apparatus, and usually is employed in opposition to a second swimming roll (not shown), with the material to be worked passing through the nip 3 between the two rolls.

The outside diameter of the shaft is chosen slightly smaller than the inside diameter of the pressure roll, so that the pressure roll is radially spaced from the shaft. The resulting space between the two rolls is subdivided by longitudinal seals 10 into two longitudinal chambers 7, 8. These seals are carried in appropriate recesses formed in the shaft circumference and bear against the inside surface 4 of the pressure roll to isolate the two chambers. The seals may have rectangular cross-sections, as shown, or the L-shaped configuration seen in Federal Republic of Germany Pat. No. 11 93 739. It is preferred to employ two such seals, disposed 180 degrees apart on the shaft circumference, but other arrangements are known in the art. The shaft is mounted such that the center of one longitudinal chamber is opposed to the nip 3. End seals 5, bearing against the inside surface 4 of the pressure roll define and seal both ends of the longitudinal chambers.

The pressure roll is supported on the shaft by hydraulic pressure, provided by hydraulic system means. Hydraulic pump means (not shown) supplies hydraulic fluid through conduits 6 and 9 to the longitudinal chambers 7 and 8, respectively, as is known in the art. The working pressure exerted upon material passing through the nip is thus the difference between the pressures within the two chambers. In order to allow hydraulic pressure to determine the working pressure, the apparatus is provided with a fixed roller bearing 11 at one end of the shaft and with a flexible roller bearing 12 at the opposite end. The flexible bearing allows movement in the plane transverse to the shaft, so that the primary determinant of the pressure roll position is the pressure exerted by the hydraulic fluid.

The pressure roll rotates during operation, of course, as shown by arrow 14. As it does so, the principles of fluid dynamics teach that the inside surface of the pressure roll exerts a drag upon the boundary layers of hydraulic fluid, resulting in a flow of hydraulic fluid in the direction of rotation, indicated by arrows 15. This flow cannot travel completely around the circumference of the shaft because the longitudinal seals block the path, and thus areas of relatively high pressure 16 and 20 exist in areas adjacent to each longitudinal seal, in the direction of rotation (hereafter referred to as the "downstream" end of each longitudinal chamber). Similarly, the same flow away from the longitudinal seal at the opposite ("upstream") end of each chamber results in the formation of relatively low-pressure zones in those areas. The further result of this pattern is a counter-flow, from high pressure zones to low pressure zones, along the circumference of the shaft, shown by arrows 18. The two flows exist at different levels of each chamber, but they make contact in the central area and exert high shear forces upon one another, inducing a high level of turbulence within the fluid. Such turbulence predictably results in power losses in driving the roll.

The present invention eliminates such power losses, providing for increased efficiency and reduced energy consumption. FIG. 3 illustrates a preferred embodiment of the invention, in which elements identical to those of the apparatus of FIGS. 1 and 2 are identically numbered. As in the apparatus previously described, a pressure roll 2 is carried concentrically on a shaft 1, with the area therebetween being divided into longitudinal chambers 7 and 8 by longitudinal seals 10. Also as previously described, rotation of the pressure roll establishes a rotational flow 15 within each chamber. Here, however, turbulence reduction means prevents the formation of a circumferential counter-flow and its resulting turbulence. The turbulence reduction means includes transverse bores 40 extending through the shaft from high-pressure zones 16 and 20 to low pressure zones 17 and 19, respectively, providing return flow paths isolated from the rotational flow. The bores are preferably parallel to the transverse axis of the shaft, offset radially from that axis sufficiently to allow a smooth flow from the high-pressure zones.

Figure 8:
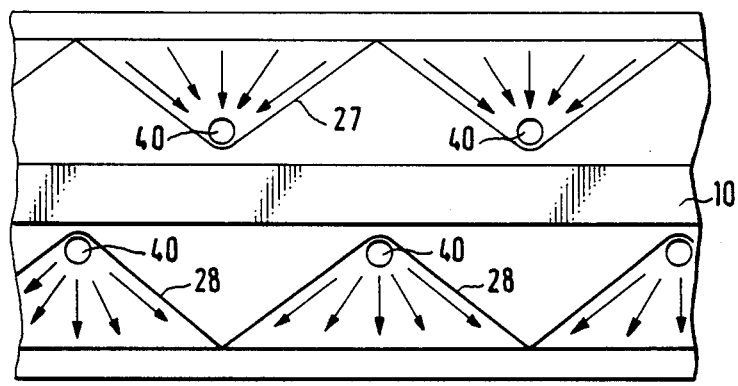
FIG. 8 is a detail side view of a further embodiment of the invention.

Although FIG. 3 illustrates the bores located in both longitudinal chambers, in practice the structural ingtegrity of the shaft is enhanced if the bores located in the two chambers are longitudinally staggered, as seen in FIGS. 4 and 5. Also, smoothness of the flow can be assisted by countersinking the bores with angular recesses 25. An alternate means of assisting flow into the bores is seen in FIGS. 6 and 7, where the bores are countersunk with funnel-like recesses 26, having a height approximately equal to the diameter of the bore, and a diameter approximately equal to the spacing between bores. These recesses minimize the abrupt changes in direction of the flow, and thus further reduce turbulence. In addition, flow guides 27 may be provided at the downstream end of each chamber to direct fluid smoothly into the bores without requiring an impact against the flat surface of the longitudinal seal. Such guides, seen in FIGS. 3 and 8, may be fabricated of a plastic or sheet metal and are positioned to guide fluid into the bores. For most efficient operation, the guides should have a height approximately equal to the height of the longitudinal chamber, but it is not necessary that the guide bear against the inner surface of the pressure roll. While it is most beneficial to provide such guides at the downstream ends of the chambers, similar guides 28 may be provided at the upstream ends, as seen in FIG. 8, to promote the even distribution of fluid across the face of the shaft.

Figure 9:
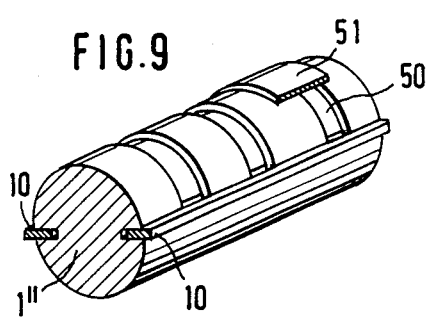
FIG. 9 is a pictorial representation of a yet further embodiment of the present invention.
Figure 10:
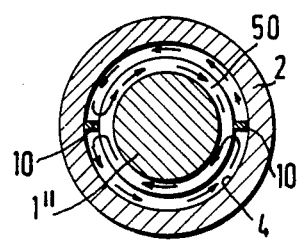
FIG. 10 is a detail transverse cross-sectional view of the embodiment of FIG. 9.

An alternate means of achieving turbulence reduction is shown in FIGS. 9 and 10. There, a return flow path isolated from the rotational flow is provided by circumferential grooves 50 formed in the surface of the shaft, covered by plates 51. The grooves are dimensioned, and the number of same chosen, to accomodate the required flow volume, as will be appreciated by those having skill in the art. The plates may be fabricated from a plastic or sheet metal material and attached to the shaft by suitable means or methods. It should be understood that FIG. 9 illustrates grooves in one longitudinal chamber only, but in practice such grooves would be located in both chambers, as shown in FIG. 10. Preferably the grooves are longitudinally staggered, to promote the structural rigidity of the shaft. The resulting flow pattern, from high pressure zones at the downstream ends of the chambers to low pressure zones at the upstream ends, is similar to that seen in the embodiment of FIG. 3, except that the return flow occurs at the circumference of the shaft rather than through its body. The plates 51 effectively isolate the return flow from the rotational flow, as shown in FIG. 10, eliminating the turbulence of prior art apparatus. Those in the art will appreciate that flow guidance means, as discussed above, can likewise be provided for this embodiment.

Those in the art will understand that various modifications and alterations may be made in swimming roll apparatus within the spirit of the present invention. For example, the sizing of bores, and the fabrication of positioning of flow guide apparatus is left to those in the art. These and other modifications may be made without departing from the spirit of the invention, which is defined solely by the claims appended hereto.

I claim:

1. Apparatus for pressure treatment of webs, comprising:

pressure roll means, formed as a hollow cylinder;

shaft means, generally cylindrical in form, concentrically disposed within said pressure roll and having an outside diameter smaller than the inside diameter of said pressure roll;

at least two longitudinal seal means carried on said shaft and bearing against the inner surface of said pressure roll, thereby defining at least one longitudinal chamber between said pressure roll and said shaft means;

hydraulic system means for introducing and maintaining a preselected fluid pressure within said chamber, whereby said pressure roll is rotatably supported on said shaft;

wherein rotation of said pressure roll in a direction from a first said longitudinal seal toward a second said longitudinal seal results in a rotational flow of said fluid from said first seal toward said second seal, thereby creating a high pressure zone within said longitudinal chamber adjacent said second seal and a low pressure zone adjacent said first seal; and return flow means for carrying a return flow of said fluid from said high pressure zone to said low pressure zone, said return flow being isolated from said rotational flow.

2. The apparatus of claim 1, wherein said return flow means includes at least one bore, extending transversely through said shaft from said high pressure zone to said low pressure zone, for channeling said return flow in isolation from said rotational flow.

3. The apparatus of claim 2, wherein said return flow means further includes means for assisting the flow of said fluid into said bore.

4. The apparatus of claim 3, wherein said flow assisting means includes a recess countersunk in an end of said bore.

5. The apparatus of claim 3, wherein said flow assisting means includes first flow guide means, radially extending from the outer surface of said shaft positioned adjacent said second longitudinal seal.

6. The apparatus of claim 5, wherein said flow assisting means further includes second flow guide means positioned adjacent said first longitudinal seal for assisting the flow of said fluid from said bore into said longitudinal chamber.

7. The apparatus of claim 1, wherein said return flow means includes a plurality circumferential grooves formed in the surface of said shaft, extending from a said high pressure zone to a said low pressure zone, for providing a path for said return flow; and plate means covering each said circumferential groove, for isolating said return flow from said rotational flow.

8. Apparatus for the pressure treatment of material webs, comprising:

pressure roll means, formed as a hollow cylinder;

shaft means, generally cylindrical in form, concentrically disposed within said pressure roll and having an outside diameter smaller than the inside diameter of said pressure roll, fixedly mounted at the ends thereof;

first and second longitudinal seal means carried on the outer surface said shaft spaced 180 degrees apart and disposed parallel to the rotational axis thereof, bearing against the inner surface of said pressure roll, thereby defining first and second longitudinal chambers between said pressure roll and said shaft means;

hydraulic system means, including conduits formed in said shaft in fluid communication with said longitudinal chambers, for introducing and maintaining a preselected fluid pressure within said chambers, whereby said pressure roll is rotatably supported on said shaft;

wherein rotation of said pressure roll in a direction from said first longitudinal seal toward said second longitudinal seal entrains first and second rotational flows of said fluid respectively within said first and second chambers, said first rotational flow extending from said first seal toward said second seal, thereby creating within said first chamber a high pressure zone adjacent said second seal and a low pressure zone adjacent said first seal, and said second rotational flow extending from said second seal toward said first seal, thereby creating within said second chamber a high pressure zone adjacent said first seal and a low pressure zone adjacent said second seal; and a plurality of transverse bores extending from said high pressure zones to said low pressure zones of both respective chambers, for carrying a return flow of said fluid from said high pressure zones to said low pressure zones, said return flow being isolated from said rotational flow.

9. The apparatus of claim 8, further including a plurality of recesses, each recess being countersunk in an end of a said bore.

10. The apparatus of claim 9, further including a plurality of upstanding flow guides, one said flow guide being associated with each said bore at the end of said bore terminating in said high pressure zone, said guide radially extending from the outer surface of said shaft substantially to the inner surface of said pressure roll, and circumferentially extending from a position between said associated bore and said adjacent longitudinal seal means toward said opposite longitudinal seal means, diverging longtudinally from said bore.

11. A method for reducing turbulence in a swimming roll apparatus, having a first longitudinal seal and a second longitudinal seal, used for pressure treatment of material webs, wherein the rotation of the pressure roll portion of the apparatus relative to the shaft portion entrains a rotational flow of fluid within the apparatus, thereby creating zones of high pressure adjacent said second longitudinal seal and zones of low pressure adjacent said first longitudinal seal within the apparatus, comprising the steps of:

providing a return flow path for fluid to flow from a zone of high pressure adjacent said second longitudinal seal within the swimming roll apparatus to a zone of low pressure adjacent to said first longitudional seal; and isolating said return flow from the rotational flow.

12. Apparatus for the pressure treatment of material webs, comprising:

a pressure roll formed as a hollow cylinder;

shaft means, generally cylindrical in form, concentrically disposed within said pressure roll and having an outside diameter smaller than the inside diameter of said pressure roll, fixedly mounted at the ends thereof;

at least two longitudinal seal means carried on said shaft and bearing against the inner surface of said pressure roll, thereby defining at least one longitudinal chamber between said pressure roll and said shaft means;

means for introducing and maintaining a preselected fluid pressure within said chamber whereby said pressure roll is rotatably supported on said shaft;

wherein rotation of said pressure roll in a direction from a first said longitudinal seal toward a second said longitudinal seal results in a rotational flow of said fluid from said first seal toward said second seal, thereby creating a high pressure zone within said longitudinal chamber adjacent said second seal and a low pressure zone adjacent said first seal; and means for carrying a return flow of said fluid from said high pressure zone to said low pressure zone, wherein said return flow means includes a plurality of cicumferential grooves formed in the surface of said shaft, extending from said high pressure zone to said low pressure zone, for providing a fluid path for said return flow which is substantially isolated from said rotational flow.

13. An apparatus according to claim 12 further comprising plate means covering each of said circumferential grooves for further isolating said return flow from said rotational flow.

* * * * *